United States Patent [19]
Bucks et al.

[11] Patent Number: 6,040,663
[45] Date of Patent: Mar. 21, 2000

[54] CIRCUIT ARRANGEMENT

[75] Inventors: Marcel J. M. Bucks; Engbert B. G. Nijhof, both of Eindhoven, Netherlands

[73] Assignee: U.S. Philips Corporation, New York, N.Y.

[21] Appl. No.: 09/128,149

[22] Filed: Aug. 3, 1998

[30] Foreign Application Priority Data

Aug. 1, 1997 [EP] European Pat. Off. .............. 97202401

[51] Int. Cl.$^7$ ....................................................... G05F 1/00
[52] U.S. Cl. ......................... 315/291; 315/307; 315/352; 315/244; 363/20; 363/21
[58] Field of Search ..................... 315/291, 352, 315/354, 307, 244, 225; 363/20, 21, 15, 59, 48

[56] References Cited

U.S. PATENT DOCUMENTS

| | | | |
|---|---|---|---|
| 4,445,166 | 4/1984 | Berglund et al. ......................... | 363/48 |
| 4,787,020 | 11/1988 | Hiramatsu et al. ....................... | 363/20 |
| 4,825,081 | 4/1989 | Wille et al. .............................. | 250/551 |
| 4,959,766 | 9/1990 | Jain .......................................... | 363/48 |
| 5,278,748 | 1/1994 | Kitajima ................................... | 363/56 |
| 5,327,334 | 7/1994 | Makino et al. ........................... | 363/20 |

OTHER PUBLICATIONS

"19$^{th}$ Annual IEEE Power Electronics Specialists Conference", 1988, vol. 1, pp. 9–17.

"Zero–Voltage Switching Multi–Resonant Technique A Novel Approach to Improve Performance of High–Frequency Quasi–Resonant Converters" by Wojciech A. Tabisz and Fred C. Lee in IEEE Power Electronics Specialists Conference, 19$^{th}$ Annual Conference: 1988, vol. 1., pp. 9–17.

*Primary Examiner*—Haissa Philogene
*Attorney, Agent, or Firm*—Edward W. Goodman

[57] ABSTRACT

In a multiresonant DC—DC converter provided with a switching element (S1), a transformer (T) and a rectifier coupled to the secondary winding (S) of the transformer, the rectifier is constructed as a diode bridge (D1, D2, D3, D4). It is achieved thereby that the maximum amplitude of the voltage across the switching element is comparatively low. The switching element is highly suitable for supplying a network of LEDs.

11 Claims, 2 Drawing Sheets

CIRCUIT ARRANGEMENT

BACKGROUND OF THE INVENTION

1. Field of the Invention

The invention relates to a circuit arrangement for supplying a load, provided with a DC—DC converter comprising:

input terminals for connection to a DC voltage source, a circuit portion which comprises inductive means and first capacitive means and which interconnects the input terminals, a switching element which shunts the first capacitive means, a control circuit coupled to the switching element for rendering the switching element conducting and non-conducting with high frequency, a transformer comprising a primary winding and a secondary winding, which primary winding is comprised in the circuit portion, and an output circuit coupled to the secondary winding and provided with output terminals for connection to the load, rectifying means coupled between the secondary winding and the output terminals, and second capacitive means connected between the secondary winding and the output terminals.

The invention also relates to a lighting unit.

2. Description of the Related Art

A circuit arrangement as mentioned in the opening paragraph is known from the proceedings of the "19th Annual IEEE Power Electronics Specialists Conference", 1988, vol. 1, pp. 9–17.

The known circuit arrangement comprises a multiresonant DC—DC converter. The switching element of the known DC—DC converter is rendered conducting while the voltage across the switching element is substantially zero, so that the amount of power dissipated in the switching element during operation is comparatively small. The amount of power dissipated in the rectifying means during operation is also comparatively small as a result of the multiresonant operation. A major drawback of the known circuit arrangement, however, is that the energy supplied by the switching device is transmitted to the output terminals during a comparatively short time interval in each high-frequency cycle. This has the result that a number of components of the circuit arrangement must be resistant to a comparatively high power level during this comparatively short time interval and must be correspondingly dimensioned. Another result is that the voltage across the switching element reaches a comparatively high value in each high-frequency cycle, which also has the result that the switching element must be dimensioned to deal with this.

SUMMARY OF THE INVENTION

The invention has for its object to provide a circuit arrangement in which only a comparatively small amount of power is dissipated during operation and which can be built up from components which need comply with only comparatively low requirements.

According to the invention, a circuit arrangement as described in the opening paragraph is for this purpose characterized in that the rectifying means are full-wave rectifying means.

Energy is transmitted to the output during two time intervals in each high-frequency cycle in a circuit arrangement according to the invention. Since the transmission of energy thus takes place during a comparatively long period, the components of the circuit arrangement need be dimensioned for only a comparatively low instantaneous power level. It was also found that the maximum value of the voltage across the switching element in each high-frequency cycle is only comparatively small, so that the switching element need not be dimensioned for high voltages. Furthermore, in case the circuit arrangement is powered by means of a rectified sinusoidal supply voltage with a frequency of 60 Hz, the circuit arrangement has to resume operating 120 times per second after each zero crossing of the supply voltage. It was found that a circuit arrangement according to the invention reaches stable operating conditions relatively quickly each time operation is resumed after a zero crossing of the supply voltage. In case the circuit arrangement according to the invention is used, for instance, as a supply circuit in a lighting unit which comprises a network of semiconductor light sources, this latter property of a circuit arrangement according to the invention is very important.

The rectifying means may comprise, for example, a diode bridge or a voltage doubler.

Good results were obtained with embodiments of a circuit arrangement according to the invention wherein said circuit portion comprises a series arrangement of the inductive means, the primary winding of the transformer, and the first capacitive means.

It was also found to be possible to construct the transformer such that the inductive means are not formed by one or more separate components but by the leakage inductance of the transformer. Since the circuit arrangement can comprise no more than one magnetic compound, it can be of a relatively simple construction.

Good results were also found for embodiments of a circuit arrangement according to the invention wherein the secondary winding of the transformer is shunted by the second capacitive means, and respective ends of the secondary winding are coupled to respective inputs of the diode bridge.

Preferably, the output terminals are interconnected by means of third capacitive means. This third capacitive means serves as a buffer capacitance.

It was found that the control circuit of a circuit arrangement according to the invention can be constructed in a comparatively simple manner if the time interval during which the switching element is non-conducting is constant.

It was also found that in many applications it is desirable to equip the circuit arrangement with a circuit part, coupled to the output terminals and to the control circuit, for controlling the current supplied by the circuit arrangement.

The circuit arrangement according to the invention is highly suitable for use as a supply circuit in a lighting unit which comprises a network of semiconductor light sources. Such a network of semiconductor light sources is supplied with a DC voltage having a comparatively small amplitude. Often, such a DC voltage is to be generated from line voltage which is a low-frequency AC voltage with a considerably higher amplitude. It was found that a circuit arrangement according to the invention generates a DC voltage with a sufficiently constant amplitude from a low-frequency AC voltage in an efficient manner. It is in addition possible, with a circuit arrangement according to the invention, to realize a very high power factor and only a small amount of interference. Such a lighting unit is particularly suitable for use as a light signal unit such as, for example, a traffic light because of inter alia, the high luminous efficacy of semiconductor light sources. The lighting unit is exposed to widely varying temperatures in such an application. Since the light output of semiconductor light sources is strongly dependent on the temperature, it is advantageous when the circuit arrangement is provided with means for adjusting the time interval during which the switching element is conducting in each high-frequency cycle in dependence on the temperature of the network of semiconductor light sources. The adjustment of the time interval during which the switching element is conducting in each high-frequency cycle in dependence on the temperature achieves that the luminous flux of the lighting unit is dependent on the temperature to a comparatively low degree only.

BRIEF DESCRIPTION OF THE DRAWINGS

An embodiment of a lighting unit according to the invention will be explained in more detail with reference to the drawing, in which.

DESCRIPTION OF THE PREFERRED EMBODIMENT

Figure 1:
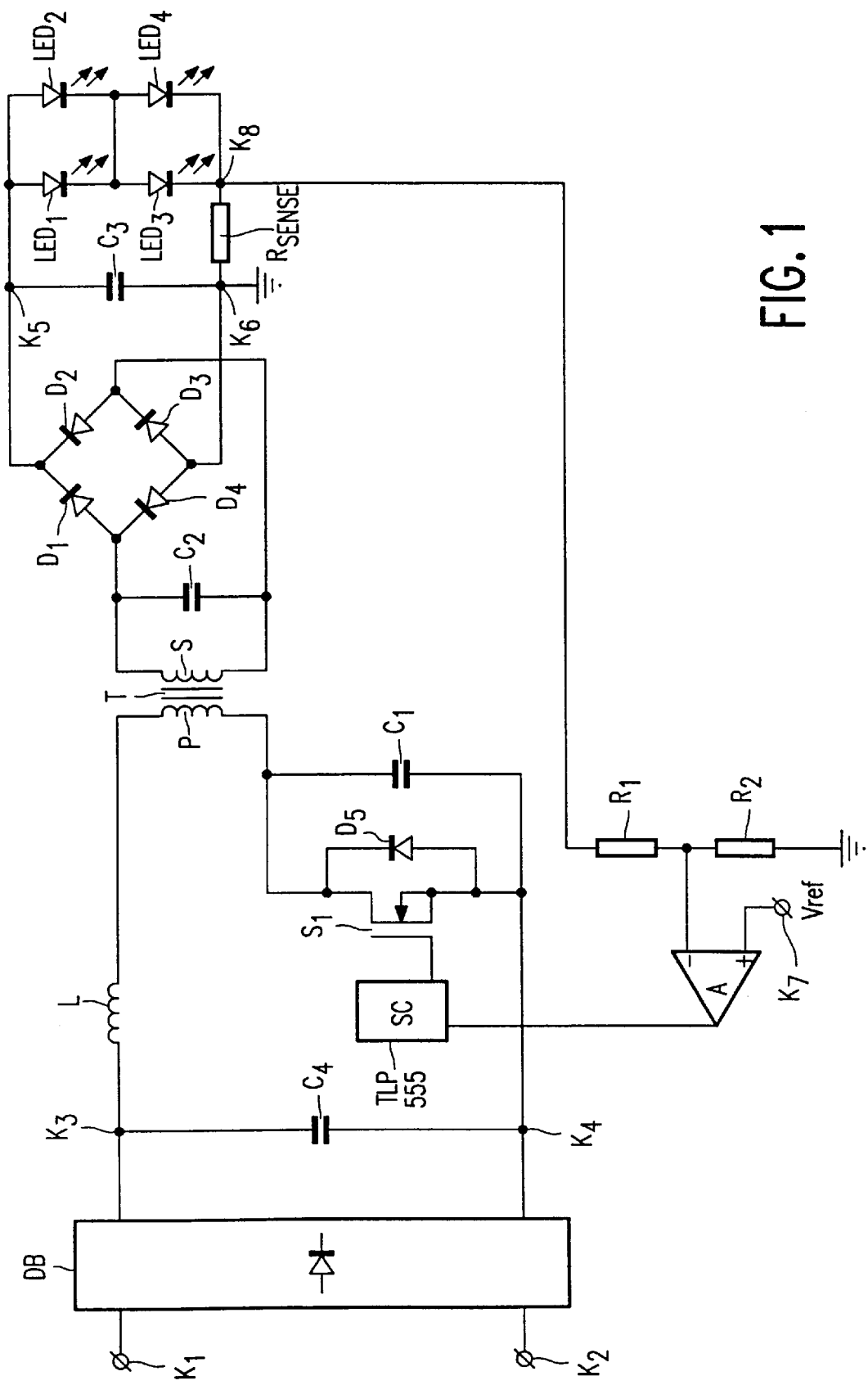
FIG. 1 is a circuit diagram of an embodiment of a lighting unit according to the invention.

In FIG. 1, K1 and K2 are terminals for connection to a supply voltage source which delivers a low-frequency AC voltage. K1 and K2 are connected to respective input terminals of a diode bridge DB. Output terminals of the diode bridge DB are connected to an input terminal K3 and an input terminal K4, respectively. K3 and K4 in this embodiment form input terminals for connection to a DC voltage source. K3 and K4 are interconnected by means of a capacitor C4 which serves as a buffer capacitance. The input terminals K3 and K4 are also interconnected by a series arrangement of a coil L, a primary winding P of a transformer T, and a capacitor C1. This series arrangement forms a circuit portion which interconnects the input terminals K3 and K4 in this embodiment. The coil L, in this embodiment, forms inductive means, and the capacitor C1, first capacitive means. The capacitor C1 is shunted by a switching element S1 whose control electrode is connected to an output of a control circuit SC for rendering the switching element S1 conducting and non-conducting with high frequency. An input of the control circuit SC is connected to an output of an amplifier A. A first input of the amplifier A is connected to a terminal K7 at which a reference voltage Vref is present during operation of the circuit arrangement, this voltage being generated by means not shown in FIG. 1. A second input of the amplifier A is connected to a common junction point of a resistor R1 and NTC R2. A first end of the series arrangement of resistor R1 and NTC R2 is connected to a terminal K8. A second end of the series arrangement is connected to a ground terminal. D5 is a diode which forms part of the switching element S1. A secondary winding S of the transformer T is shunted by a capacitor C2 which, in this embodiment, forms second capacitive means. Ends of the secondary winding S are connected to respective input terminals of a diode bridge which forms rectifying means in this embodiment and which consists of diodes D1, D2, D3 and D4. Output terminals K5 and K6 of the diode bridge are interconnected by a capacitor C3 which, in this embodiment, forms third capacitive means and acts as a buffer capacitance. The output terminals of the diode bridge, at the same time, are the output terminals of the circuit arrangement. A network of semiconductor light sources is connected to these output terminals. The semiconductor light sources are formed by LEDs and the network is diagrammatically depicted in FIG. 1 as the four LEDs: LED1 to LED4. A resistor Rsense is connected between terminal K6 and terminal K8. Terminal K6 is connected to a ground terminal. Terminal K8 forms a common terminal of the network and the resistor Rsense.

The operation of the embodiment shown in FIG. 1 is as follows.

When the terminals K1 and K2 are connected to a supply voltage source delivering a low-frequency AC voltage, this low-frequency AC voltage is rectified by the diode bridge DB, and a DC voltage will be present across capacitor C4. The control circuit SC renders the switching element S1 alternately conducting and non-conducting with high frequency. As a result of this, a high-frequency current will flow in the series circuit of coil L, primary winding P, and capacitor C1, and a high-frequency AC voltage will obtain between the ends of the secondary winding S. Six consecutive operational conditions of the circuit arrangement can be distinguished within each high-frequency cycle associated with this high-frequency AC voltage. In the first operational condition, the switching element S1 is conducting, and the current flows through the primary winding from the input terminal K3 to the input terminal K4. The instantaneous amplitude of the high-frequency AC voltage across capacitor C2 is so great that the diodes D1 and D3 of the diode bridge are conducting and the buffer capacitance formed by capacitor C3 is charged. Capacitor C3 is connected in parallel to capacitor C2 owing to the fact that the diodes D1 and D3 are conducting. Since the capacitance value of capacitor C3 is often chosen to be comparatively high, there is practically no resonance action of the capacitors C2 and C3 in conjunction with the coil L, so that the DC—DC converter behaves as a non-resonant forward converter in this first operational condition. Capacitor C4 has a comparatively small capacitance, so that the instantaneous amplitude of the voltage across capacitor C4 is substantially equal to the instantaneous amplitude of the low-frequency AC voltage. The current through the primary winding P will increase or decrease in dependence on the instantaneous value of the voltage across capacitor C4 and the voltage across the primary winding P. The first operational condition ends and the second starts the moment the switching element S1 is rendered non-conducting by the control circuit. The current through the primary winding P subsequently charges the capacitor C1 in the second operational condition. Since the coil L, in this second operational condition, is in resonance with the capacitor C1, the voltage across capacitor C1 rises to a value which is higher than the instantaneous value of the voltage across capacitor C4. The diodes D1 and D3 remain conducting until the instantaneous amplitude of the current through the primary winding has fallen to zero. The current through the primary winding then reverses its direction, and capacitor C1 is discharged. The capacitor C2 is also discharged, so that the diodes D1 and D3 are no longer conducting, but are cut off. The second operational condition ends and the third starts when the diodes D1 and D3 stop conducting. In the third operational condition, the capacitor C3 is no longer connected in parallel to the capacitor C2. The capacitance value of capacitor C2, however, is chosen to be so much higher than that of capacitor C1 that capacitor C1 is in resonance with the coil L in the third operational condition. The voltage across capacitor C2 is zero the moment the voltage across the primary winding P changes its sign. Then, the capacitor C2 is charged to a voltage whose polarity is opposed to that of the voltage which was present across capacitor C2 in the first and the second operational condition. The third operational condition ends and the fourth starts when the amplitude of the voltage across capacitor C2 has become so high that diodes D2 and D4 become conducting and capacitor C3 is charged. In this fourth operational condition, energy stored in capacitor C1 is transferred to capacitor C3. The fourth operational condition ends and the fifth begins when the voltage across capacitor C1 has fallen so far that the diode D5 becomes conducting. There is no resonance in this fifth operational condition. The switching element S1 is rendered conducting by the control circuit SC, while the diode D5 is in the conducting state, so that no switching losses occur during this process of rendering the switching element conducting. When the current through the primary winding changes its direction, the amplitude of the voltage across capacitor C2 drops, and the diodes D2 and D4 become non-conducting. The fifth operational condition ends and the sixth starts the moment the diodes D2 and D4 stop conducting. In the sixth operational condition, the current through the primary winding P and the switching element S1 rises, and capacitor C1 is charged. Capacitor C2 is also charged. When the instantaneous amplitude of the voltage across capacitor C2 is so great that the diodes D1 and D2 become conducting, the sixth operational condition ends and the first begins again. The capacitance value of capacitor C3 is chosen to be so high that the voltage across the capacitor C3 hardly changes during a high-frequency cycle. The network of LEDs is supplied by means of this DC voltage across capacitor C3 when the circuit arrangement is in operation.

Since energy is transferred to the output of the converter during the periods of both the first and second and the fourth and fifth operating conditions, less stringent requirements need be imposed on the dimensioning of, for example, capacitor C3 than is the case in converters in which this energy transfer takes place during one time interval only, and thus during a smaller fraction of each high-frequency cycle. It is to be noted on the diode bridge formed by the diodes D1–D4 that, if the diode bridge is cut off, the maximum voltage across both the series arrangement formed by diode D1 and diode D4 and the series arrangement formed by diode D2 and diode D3 is at most equal to the voltage between the output terminals, so that the maximum reverse voltage of each diode is comparatively low. The maximum current flowing in each of the diodes is also comparatively small. This renders it possible to construct the diode bridge from fast and comparatively inexpensive diodes. The maximum amplitude of the voltage across the switching element S1 is comparatively low, so that also the switching element need comply with less stringent requirements as regards this maximum voltage.

During operation, the voltage at terminal K8 forms a signal that represents the amount of current consumed by the network. By means of this signal, the current consumed by the network is controlled at a substantially constant value via the amplifier A and the control circuit SC.

When the temperature of the network of LEDs rises, the temperature of the NTC R2 rises as well. As a result, the voltage across the NTC R2 decreases, and thus, also the voltage at the second input of the amplifier A because the resistance of the NTC R2 decreases with an increase in temperature. The voltage at the output of the amplifier rises because the voltage at the first input of amplifier A remains equal to Vref. The control circuit SC reacts to this increase in voltage by making the time interval, during which the switching element S1 is conducting, longer in each high-frequency cycle. The result of this is that more power is supplied to the network of LEDs. Since the light output of LEDs decreases with an increase in temperature, this increase in the supplied power results in the luminous flux delivered by the network of LEDs varying only within comparatively narrow limits over a comparatively wide temperature range.

Figure 2A:
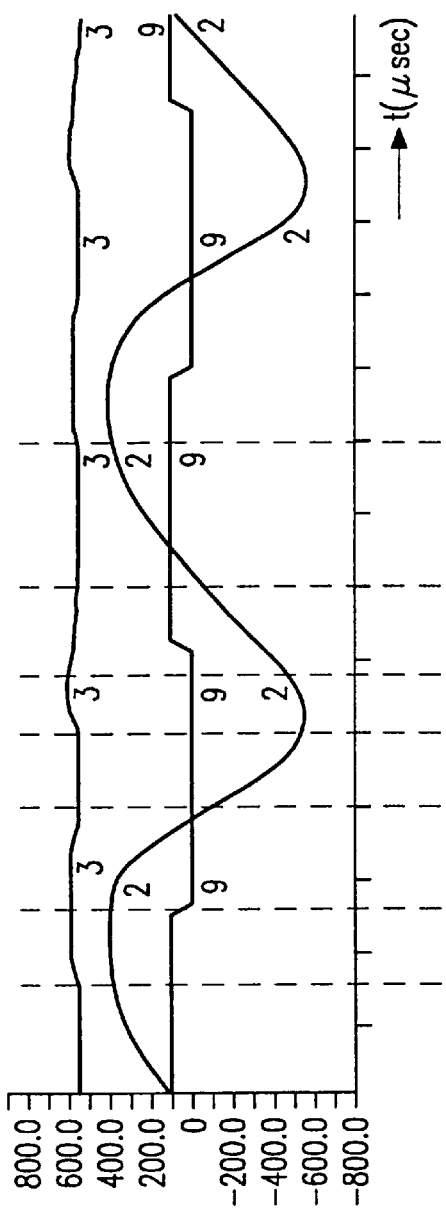
FIGS. 2A and 2B show the waveforms of a number of voltages and currents in the circuit arrangement shown in FIG. 1 as a function of time.
Figure 2B:
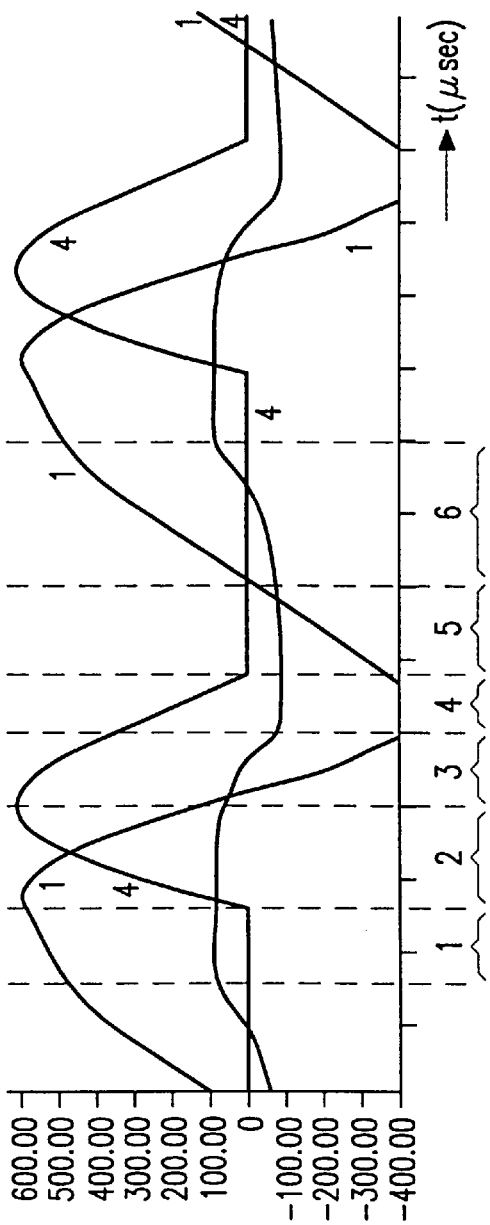

Time is plotted in microseconds on the horizontal axis both in FIG. 2A and in FIG. 2B. Curve 1 represents the current through the primary winding in mA multiplied by 1000. Curve 2 is the current through the secondary winding S in mA divided by 6. Curve 3 is the direct current absorbed by the network of LEDs in mA. Curve 4 is the voltage across the capacitor C1 (and thus also across the switching element S1) in volts. Curve 9 is the control signal generated by the control circuit SC in mV divided by 100. The vertical broken lines indicate transitions between consecutive operational conditions. The time intervals during which the circuit arrangement is in the six consecutive operational conditions are indicated under the horizontal axis of FIG. 2(B) and identified with the numbers 1 to 6. All curves of FIGS. 2A and 2B were measured for an instantaneous amplitude of the low-frequency supply voltage of 165 V (this is approximately the maximum amplitude of the low-frequency supply voltage in the case of a low-frequency supply voltage of 120 V rms). It is apparent that the maximum voltage across the switching element is no more than approximately 600 V. It was found that the maximum voltage across the switching element is 150 to 200 V higher in cases where the rectifying means is constructed as a diode instead of a diode bridge.

In a practical embodiment of the lighting unit shown in FIG. 1, the network of LEDs comprised 18 red LEDs which together consumed a power of approximately 15 W in the case of an output voltage of approximately 14 V. The capacitance values of the capacitors C1, C2, C3, and C4 were 2.2 nF, 267 nF, 470 µF, and 330 nF, respectively. The inductance value of the coil L was 1.6 mH. The number of turns in the primary winding P of the transformer T was four times the number of turns of the secondary winding S. The circuit arrangement was supplied with a low-frequency sinusoidal voltage of 120 V rms with a frequency of 60 Hz. The frequency with which the control circuit SC rendered the switching element conducting and non-conducting was approximately 67 kHz. A power factor of 0.95 was measured for this circuit arrangement. The luminous flux issuing from the lighting unit varied between comparatively narrow limits over a temperature range from −40° C. to +65° C.

What is claimed is:

1. A circuit arrangement for supplying a load, provided with a DC—DC converter comprising:

input terminals for connection to a DC voltage source;

a circuit portion comprising inductive means and first capacitive means, said circuit portion interconnecting the input terminals;

a switching element for shunting the first capacitive means;

a control circuit coupled to the switching element for rendering the switching element conducting and non-conducting with high frequency;

a transformer comprising a primary winding and a secondary winding, said primary winding being included in the circuit portion; and an output circuit coupled to the secondary winding, said output circuit comprising:

output terminals for connection to the load;

rectifying means coupled between the secondary winding and the output terminals; and second capacitive means connected between the secondary winding and the output terminals, characterized in that the rectifying means is full-wave rectifying means for ensuring that energy is transferred to the output terminals during two time intervals in each high frequency cycle of an output signal on the secondary winding.

2. A circuit arrangement as claimed in claim 1, wherein the rectifying means comprises a diode bridge.

3. A circuit arrangement as claimed in claim 1, wherein the rectifying means comprises a voltage doubler.

4. A circuit arrangement as claimed in claim 1, wherein said circuit portion comprises a series arrangement of the inductive means, the primary winding of the transformer, and the first capacitive means.

5. A circuit arrangement as claimed in claim 1, wherein the inductive means comprises a leakage inductance of the transformer.

6. A circuit arrangement as claimed in claim 2, wherein the secondary winding of the transformer is shunted by the second capacitive means, and respective ends of the secondary winding are coupled to respective inputs of the diode bridge.

7. A circuit arrangement as claimed in claim 1, wherein said circuit arrangement further comprises third capacitive means for interconnecting the output terminals.

8. A circuit arrangement as claimed in claim 1, wherein a time interval during which the switching element is non-conducting is constant.

9. A circuit arrangement as claimed in claim 1, wherein the circuit arrangement further comprises a circuit part, coupled to the output terminals and to the control circuit, for controlling the current supplied by the circuit arrangement.

10. A lighting unit comprising a circuit arrangement for supplying a load, and a network of semiconductor light sources comprising said load coupled to output terminals of said circuit arrangement, wherein said circuit arrangement is provided with a DC—DC converter, and comprises:

input terminals for connection to a DC voltage source;

a circuit portion comprising inductive means and first capacitive means, said circuit portion interconnecting the input terminals;

a switching element for shunting the first capacitive means;

a control circuit coupled to the switching element for rendering the switching element conducting and non-conducting with high frequency;

a transformer comprising a primary winding and a secondary winding, said primary winding being included in the circuit portion; and an output circuit coupled to the secondary winding, said output circuit comprising:

said output terminals for connection to the network of semiconductor light sources;

rectifying means coupled between the secondary winding and the output terminals; and second capacitive means connected between the secondary winding and the output terminals, characterized in that the rectifying means is full-wave rectifying means for ensuring that energy is transferred to the output terminals during two time intervals in each high frequency cycle of an output signal on the secondary winding.

11. A lighting unit as claimed in claim 10, wherein the circuit arrangement is provided with means for adjusting the time interval during which the switching element is conducting in each high-frequency cycle in dependence on a temperature of the network of semiconductor light sources.

* * * * *